United States Patent
Erdel

(10) Patent No.: US 6,318,220 B1
(45) Date of Patent: Nov. 20, 2001

(54) SYSTEM AND METHOD FOR FINISH MACHINING DIFFERENTIAL HOUSINGS

(75) Inventor: Bert P. Erdel, Belle Mead, NJ (US)

(73) Assignee: Malpal, Inc., Piscataway, NJ (US)

( * ) Notice: Subject to any disclaimer, the term of this patent is extended or adjusted under 35 U.S.C. 154(b) by 0 days.

(21) Appl. No.: 09/533,953

(22) Filed: Mar. 23, 2000

(51) Int. Cl.[7] ..................... B23B 1/00
(52) U.S. Cl. .............. 82/1.11; 82/1.2; 82/1.5; 82/131
(58) Field of Search .............. 82/1.11, 1.2, 1.3, 82/1.5, 12, 86, 63, 113, 128, 131, 50

(56) References Cited

U.S. PATENT DOCUMENTS

| | | | |
|---|---|---|---|
| 3,315,549 | * 4/1967 | Malschner | 82/1.5 |
| 4,945,792 | * 8/1990 | Gardner | 82/1.2 |
| 5,086,676 | * 2/1992 | Gifford et al. | 82/131 |
| 5,159,862 | * 11/1992 | Byrnes | 82/1.11 |
| 5,209,145 | * 5/1993 | Baudermann | 82/1.5 |
| 5,967,007 | * 10/1999 | Scheer | 82/1.5 |

* cited by examiner

*Primary Examiner*—Henry Tsai
(74) *Attorney, Agent, or Firm*—Brian D. Dinicola

(57) ABSTRACT

A method of machining a differential housing defining a cavity having opposed concave interior surfaces from a workpiece having first and second transverse bores defined therein. A tool having a retractable cutting insert is mounted on a spindle of a machining center, the cutting insert being pivotably mounted within the tool to rotate about a pivot axis and having distal and proximal cutting edges at opposite ends thereof. The tool is inserted into the first bore defined in the workpiece while the cutting insert is retained in a retracted position within the tool. A force is applied to the cutting insert so as to overcome a bias urging the cutting insert into the retracted position, the force being sufficient to urge the distal and proximal cutting edges into contact with corresponding interior portions of the work piece. The tool is rotated while the force is applied so that the cutting edges continuously remove material from the workpiece until they reach an outer limit of pivoting, thereby defining the concave interior surfaces.

10 Claims, 2 Drawing Sheets

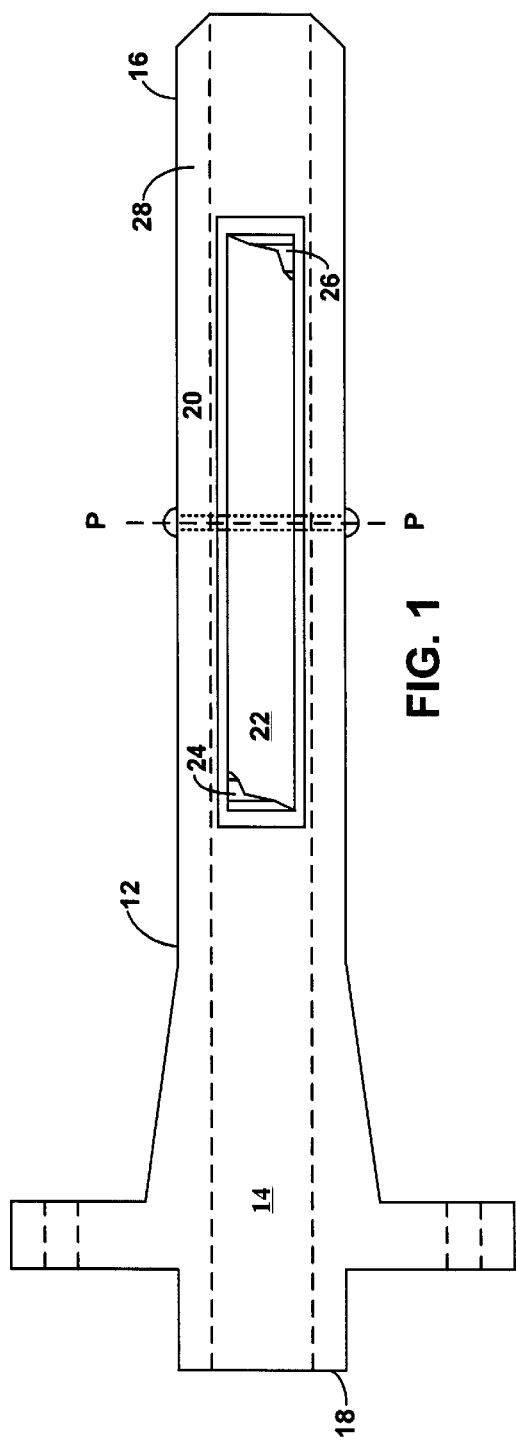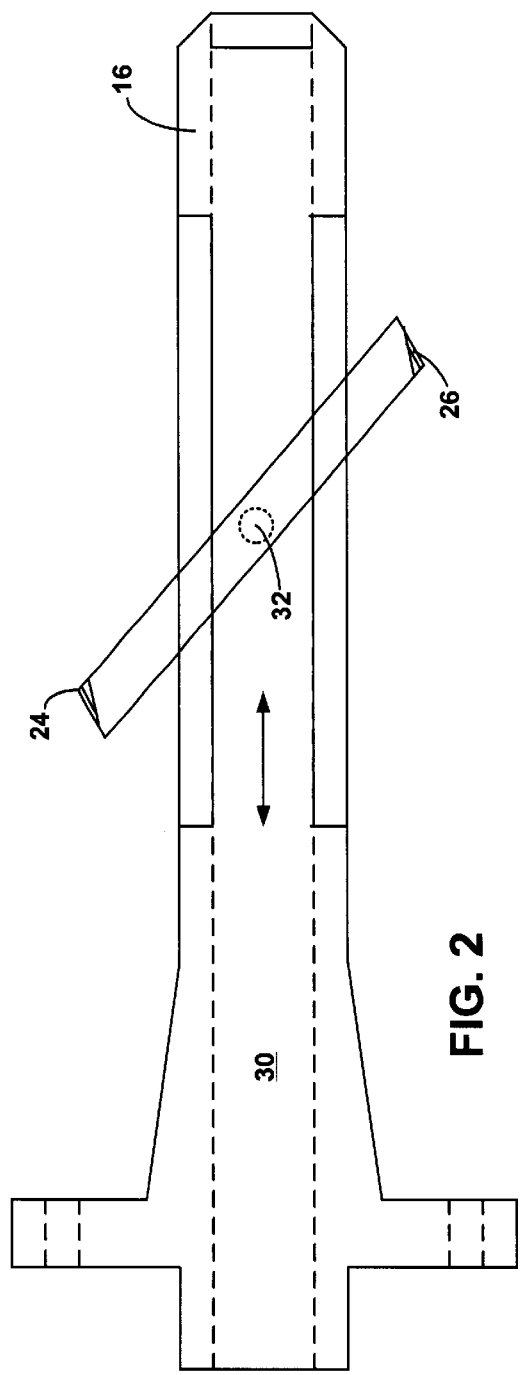

SYSTEM AND METHOD FOR FINISH MACHINING DIFFERENTIAL HOUSINGS

FIELD OF THE INVENTION

The present invention relates generally to the machining of materials and, more particularly, to the machining of inner contours in work piece cavities accessible only through small openings.

DISCUSSION OF THE BACKGROUND ART

Frequently, it is necessary to surface machine precise contours within cavities that are formed in a work piece but accessible only through very small openings. For example, in the machining of a work piece such as an automotive differential housing, it is necessary to machine two or more coaxial bores of different diameters with at least one bore having a shoulder at one end so that a shaft can be journalled in the housing. Machining of differential housings requires very close tolerances, accurate coaxial alignment of the two bores and precise location of bearing faces. This generally requires that the bores be machined while the work remains chucked at the same station and preferably by the same boring tool. Moreover, multiple shafts are typically journalled in the differential housing so that close tolerances must also be met as between these shaft journals.

In U.S. Pat. No. 3,884,590, there is disclosed an adjustable dual tool boring bar that is mounted for rotational adjustment with its axis offset from the axis of the machine spindle. Cutting tools are mounted diametrically opposite on the boring bar. Because the boring bar axis is offset from the spindle axis, rotation of the boring bar on its adjustment axis through 180 degrees reverses the tools, one being retracted inwardly and the other being advanced radially outwardly of the spindle axis. Other types of eccentric quills have also been used to machine differential housings. Generating heads, also known as facing heads, can also be used to carry a boring bar and move the boring bar radially, transversely of the spindle axis, to perform the multiple machining operations required for differential housings. However, during machining the boring bar is still eccentric to the spindle axis. Such facing heads may be of the general type shown in U.S. Pat. No. 4,004,332.

Prior art techniques for machining differential housings using eccentric tooling operated satisfactorily at relatively low speeds of say 250 to 750 rpm with housings made of steel or cast iron. However, they cannot be used effectively at higher cutting speeds required for cast aluminum housings, for example, 1,000 to 4,000 rpm. With prior art eccentric tools, it is difficult, if not impossible, to maintain the tool balanced and hence maintain the close tolerances and accuracies required for precise machining of the differential housing. The larger internal diameter of the back bore further contributes to the difficulties in maintaining the tool balanced. The tool must have a diameter small enough to allow it to be inserted through the bore with sufficient clearance to allow it to be moved radially to its eccentric position for the back boring operation. With tools extending any substantial distance from the spindle bearings, commonly referred to as overhang, any unbalance in the tooling is further accentuated at the unsupported end of the tool. Even with generating heads where the overhang of the head has been minimized, for example, of the type disclosed in U.S. Pat. No. 4,004,332, the overhang of the generating head and the boring bar contribute further to unbalance and wobble at high cutting speeds.

Accordingly, a need exists for a machine tool and method to perform precise high-speed finish machining, of internal cavities accessible through small bores, that may be easily adapted to machining bores of different diameters.

SUMMARY OF THE INVENTION

The aforementioned need is addressed, and an advance is made in the art, by employing a rotating tool having a pivotable cutting insert that is configured to open up upon insertion through a bore of given diameter. This extension of the tool permits machining of a cavity having arcuate shoulders and a larger interior diameter region. In accordance with an illustrative embodiment of the present invention, arcuate positioning of the cutting insert is achieved and maintained by the camming action of a draw bar that is moved axially within the tool bore. Alternatively, however, the tool may be readily adapted for use with a wider range of machining center devices (i.e., those not equipped with a drawbar) by including a push rod which extends, upon the application of a fluid such as the coolant oil, to provide the requisite camming action.

According to the method of the present invention, the tool is inserted within an access opening previously bored in the workpiece. Guide pads disposed within the access opening, at either end of the workpiece, maintain the tool in a precise alignment so as to ensure dimensional accuracy. During this time, the cutting insert is maintained in a retracted orientation within the tool by, for example, a biasing spring disposed near the distal end of the tool. Once the tool is properly positioned, the cutting insert is advanced out of the retracted position. In machine centers not equipped with a draw bar, this is achieved by applying an amount of coolant pressure to the push rod sufficient to achieve the desired camming action. Illustratively, to obtain a spherical cavity having a diameter of 104 mm, the tool may be inserted into a 20.3 mm hole, rotated at a speed of 3000 rpm with a feed rate of 0.1 mm per revolution and a depth of cut of 0.3 mm per surface. Under such conditions, a coolant pressure of about 20 bar is sufficient to provide the necessary camming action.

Once the appropriate cavity has been machined, the coolant pressure is bled off to allow the cutting insert to return to the retracted position, whereupon the tool is withdrawn from the workpiece.

BRIEF DESCRIPTION OF THE DRAWINGS

The invention will be better understood by reference to the detailed description that follows taken in conjunction with the accompanying drawings, in which:

FIG. 1 is a cross sectional view of a tool adapted for mounting on the spindle of a machining center and configured to machine a differential housing or other structure having one or more concave interior surfaces in accordance with the method of the present invention, the tool being retracted so as to accommodate insertion through a small diameter opening in the workpiece;

FIG. 2 is a cross sectional view of the tool of FIG. 1, shown in an expanded condition under the action of a fluid or mechanical actuator so as to effect the incremental removal of material from the interior of the workpiece as the spindle is rotated.

DETAILED DESCRIPTION OF THE INVENTION

Figure 3:
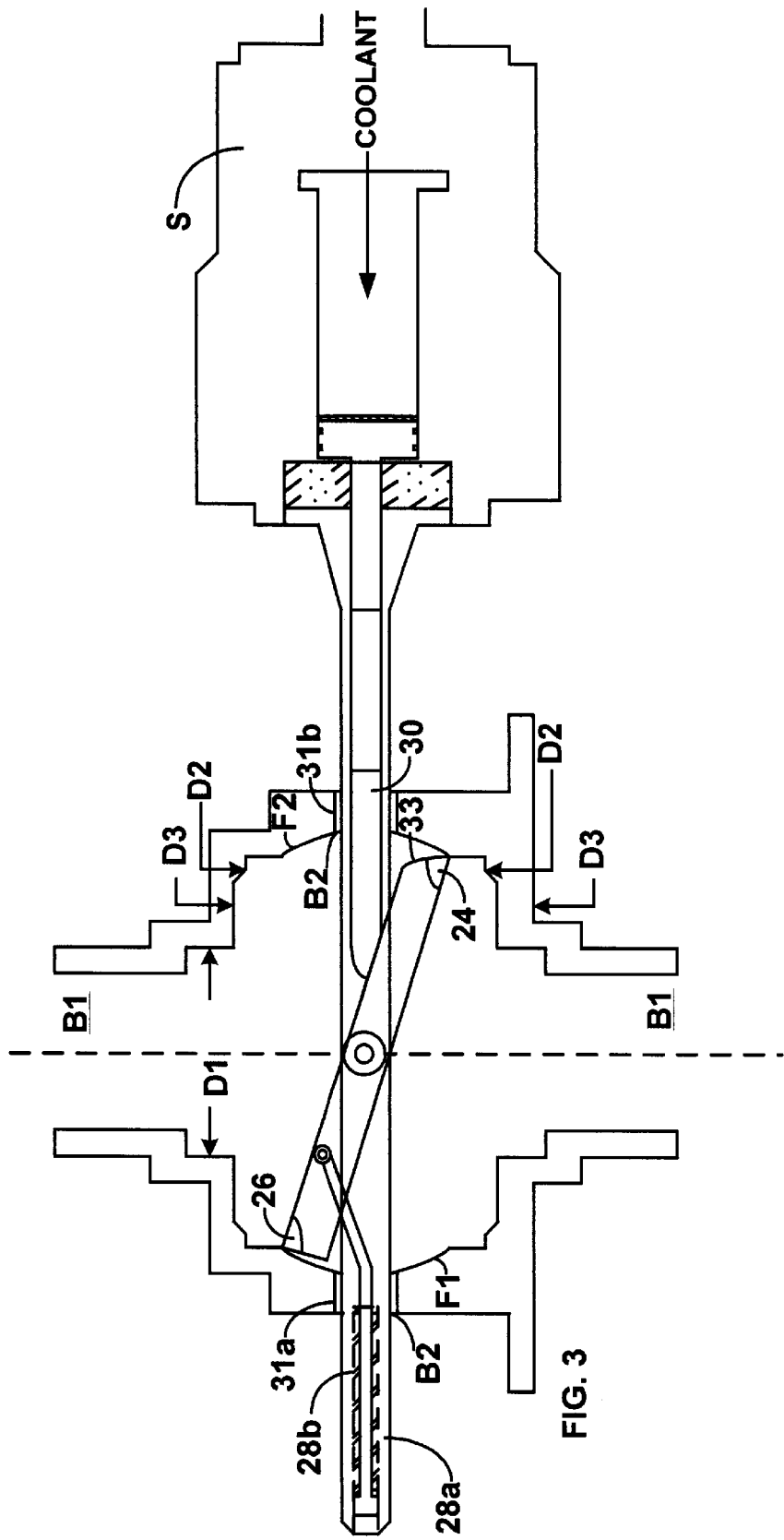
FIG. 3 schematically illustrates the operation of the tool of FIG. 1 while attached to a rotating spindle, the cutting insert being shown at the outer limit of its arcuate travel after having machined two concave surfaces on the interior of the workpiece in accordance with the method of the present invention.

An exemplary embodiment of a machining assembly 10 which may be employed to achieve the objectives of the present invention is shown in FIG. 1 and includes a shaft-like main body generally designated by reference numeral 12. As will be described in greater detail later, main body 12 is mounted by appropriate means, not shown, for rotation about its longitudinal axis and defines a central longitudinal bore 14. Disposed between the distal end 16 and proximal end 18 of main body 12, there is further defined an elongated axial slot 20 that is coaxial with longitudinal bore 14. For a purpose that will soon be described, a cutting insert generally indicated at 22, is disposed within the slot 20 and is pivotably attached to main body 12 for pivotal movement about pivot axis P. In the illustrative embodiment of FIG. 1, cutting insert 22 is configured with a cutting edge 24 and 26 at each end thereof Such an arrangement advantageously allows two concave surfaces to be machined in the workpiece during the same operation. It will, of course, be readily appreciated by those skilled in the art that a single cutting edge may be employed in the event it is not necessary or desirable to obtain a symmetrical arrangement of opposing concave surfaces within the interior of the workpiece.

It will be noted that while in the orientation shown in FIG. 1, the tool 10 may be easily inserted into a relatively small bore within a workpiece. To maintain the tool in this retracted orientation, retention means 28 (which will be described in greater detail in connection with FIG. 3) is preferably included such that the cutting insert may only be extended in the event a sufficient force is exerted thereon. In that regard, it should be noted that a variety of techniques may be employed to exert the requisite actuating force on the cutting insert.

With reference now to FIG. 2, it will be seen that when the appropriate amount of force is exerted upon the cutting insert 22 it will extend until it reaches a limit of arcuate travel that ultimately defines the maximum diameter of the concavity to be machined This limit may be established, for example, by incorporating limit stops across slot 20. In the illustrative example of FIGS. 1 and 2, however, this is achieved by using a reciprocally movable push bar or rod 30 to exert actuating forces upon the cutting insert 22. By carefully monitoring the position (i.e., extent of travel or stroke length) of push rod 30, it is possible to precisely regulate the arcuate travel of the cutting insert 22. Where the method of the present invention is to be performed using a machine center equipped with a drawbar, the push rod 30 may be moved axially against the cutting insert by action of the drawbar. However, as many machining centers are not so equipped, an especially preferred embodiment of the method of the present invention is performed using the pressure of the cooling fluid which must in all cases be present during the removal of material from a workpiece.

With reference now to FIG. 3, the method of the present invention may be better understood by viewing the operation of the tool in connection with the machining of an exemplary workpiece such, for example, as the differential housing W. As will be appreciated by those skilled in the art, prior to the machining of the concave surfaces in the workpiece according to the present invention, a number of preliminary machining steps must be performed. Two transverse bores indicated generally at B1 and B2 are formed in successive drilling operations. Thereafter, a continuous cylindrical cavity portion having a diameter D1 is formed by widening the interior portion of bore B1 in a subsequent drilling operation. Likewise, a continuous cylindrical cavity portion having diameter D2 is formed by widening the interior portion of bore B2. Finally, a third continuous cylindrical cavity portion having diameter D3 is formed by widening bore B2 a second time. The workpiece, having the resulting composite cavity, is now ready for the final machining of opposing concave interior face portions F1 and F2 in accordance with the present invention.

The tool 10 is delivered to the machine center spindle S, which may or may not be equipped with a drawbar for actuating the push rod 30, and is then inserted into one of the transverse bores, illustratively, bore B2 which in the illustrative example has a diameter of 20.3 mm. High precision diamond guide pads 31a, 31b are preferably inserted within each end of bore B2 to enhance the accuracy of the operation by limiting oscillatory movements of the tool during rotation. At the time of insertion, the cutting insert 22 is in the retracted position (i.e., the axial 0 position). An amount of force sufficient to overcome the retaining force on the cutting insert is applied to the push rod 30. This is achieved by extension of push rod 30 as its leading edge impinges on the curved camming surface 33 of the cutting insert 22. It should be noted that although the application of a force by use of a push rod is contemplated when the workpiece is comprised of relatively hard materials such, for example, as cast iron, with softer materials—such, for example, as aluminum—the centrifugal force generated by rotation of the tool may be sufficient to omit such additional force application.

Using the illustrative embodiment of the tool 10 shown FIGS. 1–3, cooling fluid at a pressure of about 20 to 30 bar is applied to move the push rod 30 in the direction of the cutting insert. This causes the cutting insert 22 to rotate around the center pin 32 (FIGS. 2 and 3), thereby overcoming the retaining force and urging the cutting edges 24 and 26 of cutting insert 22 against the material to be removed from the interior of the workpiece to form faces F1 and F2. At the same time, rotation of the spindle is commenced, illustratively at a rate of from about 800 to 3000 rpm, the precise rate being selected based upon the composition of the workpiece, blade geometry, and feed rate of the workpiece. Chip thickness should not exceed 0.5 mm, however, and thus relatively accurate pre-machining should be preformed prior to employing the method of the present invention.

The expansion of the tool leading to the feed motion is initiated by a defined axial displacement of the pressure bar via a curve profile on the twin cutting insert blades. Using a fluid pressure of about 20 bar, a depth of cut of about 0.3 mm per surface is obtained at a feed rate of about 0.1 mm. In the illustrative example of FIG. 3, full extension of the push rod 30 (which has a stroke length of about 23 mm), causes the cutting insert is rotate by an angle $\theta$ of about 28.5 degrees. As was indicated earlier, the diameter of each concave surface is precisely controlled by limiting the arcuate extension of cutting insert, which in turn is regulated by the pressure of the coolant impinging on the push rod 30 or, alternatively, by the movement of a drawbar. It will thus be readily appreciated by those skilled in the art that one or two spherical faces, illustratively having a radius of curvature of between 20 and 66 mm, may be quickly and easily formed in a workpiece cavity in accordance with the method of the present invention. When surface(s) having the appropriate spherical profile have been obtained, the cutting insert 22 is retracted. In the illustrative embodiment of FIG. 3, this is achieved using a linkage consisting of a tension cable 28a and a retraction spring 28b.

Tool 10 offers several advantages in performing highly accurate surface machining operations of the type described. Because tool 10 rotates coaxially and cutting insert 22 is concentric with the spindle longitudinal axis, tool 10 can be balanced for operation at high rpms. By way of example, tools constructed according to the present invention have been operated at 1800–3500 rpm for machining aluminum differential housings. Such high speed machining has not been achieved with eccentric tooling. Because tool 10 rotates coaxially with the spindle on the spindle axis, body 12 can have a relatively large diameter with minimum clearance in bore 22. Consequently, sufficient strength and rigidity can be built into the tool to operate effectively with a large overhang from the spindle bearings. In contrast, with eccentric tooling the diameter of the tool must be small to provide sufficient clearance between the eccentric tool and the bore so that the tool can be inserted through the bore and then moved to its eccentric machining position as with a generating head. A larger mass can be provided with a larger diameter tool, as contrasted to a small diameter eccentric tool, and hence, the tool is more readily kept in balance at high rpm.

From the foregoing description, the features and advantages of the present invention to simultaneously machine concave surfaces in a workpiece such as a differential housing will now be more fully understood and appreciated. The present invention is especially suited for high speeds required for aluminum differential housings. However, with these higher speeds having been achieved, the present invention would also be useful to machine differential housings made of steel and cast iron to reduce the machine cycle time. Similarly, although the present invention is especially suited for simultaneously machining two surfaces on a differential housing where each surface has an identical profile and radius of curvature, the present invention is also potentially useful for other boring and facing applications, including those in which surfaces having different profiles or in which only a single concave surfaces is required. Therefore, although a specific construction and operation of tool 10 has been described herein for purposes of illustration of the method of the present invention, it will be understood that they are not intended to indicate the limits of the present invention, the scope of which is defined in the following claims.

What is claimed is:

1. A method of machining a differential housing defining a cavity having opposed concave interior surfaces from a workpiece having first and second transverse bores defined therein, comprising the steps of:

mounting a tool having a retractable cutting insert on a spindle of a machining center, the cutting insert being pivotably mounted within the tool to rotate about a pivot axis and having distal and proximal cutting edges at opposite ends thereof;

inserting said tool into the first bore defined in the workpiece while retaining the cutting insert in a retracted position within said tool, said inserting step including placing first and second guide pads within first and second regions of the first bore to thereby limit oscillatory movements of the tool during rotation thereof;

applying a force to the cutting insert so as to overcome a bias urging the cutting insert into the retracted position and to urge the distal and proximal cutting edges into contact with corresponding interior portions of the workpiece; and rotating the tool during said applying step so as to thereby cause the cutting edges to remove material from the workpiece and to thereby define the concave interior surfaces.

2. The method of claim 1, wherein said applying step includes introducing fluid under pressure through the tool, said fluid acting on a linearly reciprocable push rod disposed within the tool and dimensioned and arranged to contact the cutting insert at a location spaced from the pivot axis.

3. The method of claim 2, wherein a substantially constant pressure is applied to the push rod during the applying step.

4. The method of claim 1, wherein said applying step includes advancing a draw bar through a longitudinal bore in the tool into contact with a linearly reciprocable push rod disposed within the tool and dimensioned and arranged to contact the cutting insert at a location spaced from the pivot axis.

5. The method of claim 1, wherein said tool is rotated at a rate of at least 800 rpm during said rotating step.

6. The method of claim 5, wherein said tool is rotated at a rate of between 800 and 4000 rpm.

7. The method of claim 5, wherein a force applied during said applying step is sufficient to obtain a feed rate of between about 0.1 and 0.2 mm per revolution.

8. The method of claim 6, wherein the cutting insert is dimensioned and arranged to provide a cutting depth of 0.1 to 0.4 mm per cutting edge.

9. The method of claim 1, wherein said workpiece is comprised of aluminum and wherein force applied during said applying step is applied by centrifugal force produced by rotation of the tool.

10. A method of machining a differential housing defining a cavity having opposed concave interior surfaces from a workpiece having first and second transverse bores defined therein, comprising the steps of:

mounting a tool having a retractable cutting insert on a spindle of a machining center, the cutting insert being pivotably mounted within the tool to rotate about a pivot axis and having distal and proximal cutting edges at opposite ends thereof;

inserting said tool into the first bore defined in the workpiece while retaining the cutting insert in a retracted position within said tool, said inserting step including placing first and second guide pads within first and second regions of the first bore to thereby limit oscillatory movements of the tool during rotation thereof;

applying a force to the cutting insert so as to overcome a bias urging the cutting insert into the retracted position and to urge the distal, and proximal cutting edges into contact with corresponding interior portions of the workpiece, said applying step including advancing a draw bar through a longitudinal bore in the tool into contact with a linearly reciprocable push rod disposed within the tool and dimensioned and arranged to contact the cutting insert at a curved camming surface spaced from the pivot axis; and rotating the tool during said applying step so as to thereby cause the cutting edges to remove material from the workpiece and to thereby define the concave interior surfaces.

* * * * *